INVENTOR
Edgar C. Worden
BY
ATTORNEY

April 14, 1959      E. C. WORDEN      2,882,328

CONTROLLER FOR REGULATING THE RESISTANCE OF A MELT

Filed Nov. 12, 1957      3 Sheets-Sheet 2

INVENTOR
Edgar C. Worden
BY
ATTORNEY

April 14, 1959  E. C. WORDEN  2,882,328
CONTROLLER FOR REGULATING THE RESISTANCE OF A MELT
Filed Nov. 12, 1957  3 Sheets-Sheet 3

INVENTOR
Edgar C. Worden
BY
ATTORNEY

2,882,328
CONTROLLER FOR REGULATING THE RESISTANCE OF A MELT

Edgar C. Worden, Cedar Grove, N.J., assignor to the United States of America as represented by the Secretary of the Interior Application November 12, 1957, Serial No. 695,997

10 Claims. (Cl. 13—24)

(Granted under Title 35, U.S. Code (1952), sec. 266)

This invention herein described and claimed, may be manufactured and used by or for the Government of the United States of America, for governmental purposes without the payment of any royalties thereon or therefor.

The present invention relates to the control of the power input of a non-metallic melt, which is heated by the passage of an A.C. current therethrough by means of a controller activated by a signal furnished by the resistance of the melt. Not only can a non-metallic melt be controlled in this manner, but also resistance elements which have an appreciable rate of resistance change versus temperature, as for example platinum or molybdenum.

The invention will be described with specific reference to the preparation of synthetic mica. It is to be understood, however, that this is merely by way of an example of one application only, and the invention is to be construed to be nowise limited thereby.

The United States depends mainly on foreign imports, principally from India, for an adequate supply of sheet mica, suitable for use in the electrical and electronics industries. Because of the importance of electrical and electronic equipment for defense purposes, sheet mica in its better qualities has long been classified as a strategic and critical material.

Many attempts have been made to prepare synthetic mica crystals of sufficient size to be useful in the electrical and electronics industries. It was known that fluor-phlogophite crystals ($KMg_3AlSi_3O_{10}F_2$) could be prepared by slowly cooling fluor-silicate melt of similar composition, having 9 to 13% fluorine in the melt in place of a chemically equivalent amount of water present in naturally occurring mica. This eliminates the necessity for working in a high-pressure autoclave or a hydrothermal bomb, a method generally regarded as unpromising for large scale production. Control of the rate of heating and cooling is essential in order to obtain crystals of suitable size for use in industry.

A direct electric resistance heating method, where the current passes through the melt has been described in U.S. Patent 2,711,435, issued June 21, 1955. Manual control of the temperature is possible, based on calculating the resistance of the melt from voltmeter and ammeter reading. This method of control, however, lacks the precision required for best crystal growth. It was desired to control this temperature of the melt automatically by means of a signal furnished by the melt resistance which would serve to actuate a controller regulating the power supplied to the melt.

It is an object of this invention to control the power input to a non-metallic melt which is heated by the direct passage of alternating current therethrough by means of an electronic controller which is activated automatically by any deviation of the resistance of the melt from a predetermined resistance program.

It is another object of this invention to control the power input to resistance elements which have an appreciable rate of resistance change versus temperature by electronic means responsive to changes of the resistance.

It is a further object of this invention to provide a circuit for sensing the deviation of a resistance from a predetermined value, and controlling the power input to the resistance in accordance with a sensing signal.

It is a further object of this invention to provide a circuit including a bridge element for sensing deviation of a resistance from a predetermined value, and controlling the power input to the resistance in accordance with a sensing signal.

It is a still further object of this invention to provide a circuit for sensing the deviation of the resistance from a predetermined value, and controlling A.C. power input to the resistance in accordance with a sensing signal by varying the impedance.

These and other objects will be apparent from the following description.

In the embodiment of the invention wherein it is used to control the power input to a melt, a batch of ingredients is placed in a melting kiln. A graphite resistor imbedded in the bath is heated by the passage of A.C. current therethrough and melts the surrounding materials. A pool of melt is thus formed, and A.C. current is passed through the melt by appropriate electrodes.

As in all melting and crystallization operations, it was desirable to have an automatic rate or program control for the process. Initial attempts to use a thermocouple placed in the melt to furnish the signal for operating a commercial type controller proved to be unsatisfactory. The carbon in the melt from the electrodes caused rapid deterioration of the platinum thermocouple which was required for the high temperatures involved. Even when they were protected by various types of ceramic tubes, the thermocouple did not last the life of a run because the melt attacked and dissolved the tubes.

It was found that the electrical resistance of the melt could be used to indicate its condition. The resistance varies inversely with the temperature of the melt, inversely with its cross sectional area, and directly with the distance of the current bath through the melt electrodes.

Voltage proportional to the current passing through the melt is impressed on one arm of a resistance bridge, and voltage proportional to the current through the melt is impressed on an adjacent arm. A third arm is a fixed resistance, while the fourth arm of the bridge consists of a variable resistance, which can be varied according to a prearranged schedule. Variation of the resistance in said fourth arm varies the signal from the bridge, which is amplified and employed to control a thyratron full-wave rectifier circuit. The latter passes D.C. current proportional to the signal received to a saturated core reactor in series with the power supply to the melt. When the core is saturated, more A.C. power is delivered to the melt and conversely when the core is less saturated, less power goes to the melt. Thus, the signal from the bridge controls the power supplied to the melt and therefore its temperature.

Among the advantages secured by the present invention are (1) there are employed a minimum of moving parts; (2) the programming of power input is easily adjusted; (3) the power input is automatically adjusted to demand; and (4) these objectives are achieved with a high degree of precision.

A preferred embodiment of this invention will be described in conjunction with the accompanying drawings in which Fig. 1 is a diagram of the control circuit;

Figure 3:
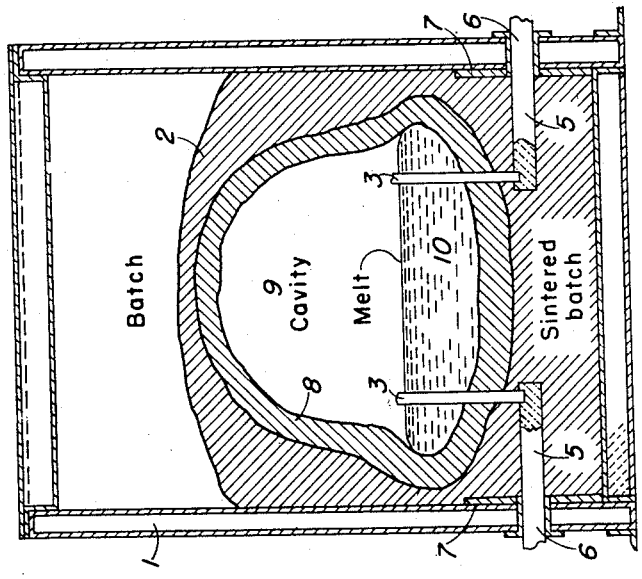
Fig. 3 shows a cross-section through the melting kiln after a considerable portion of the batch has melted.
Figure 2:
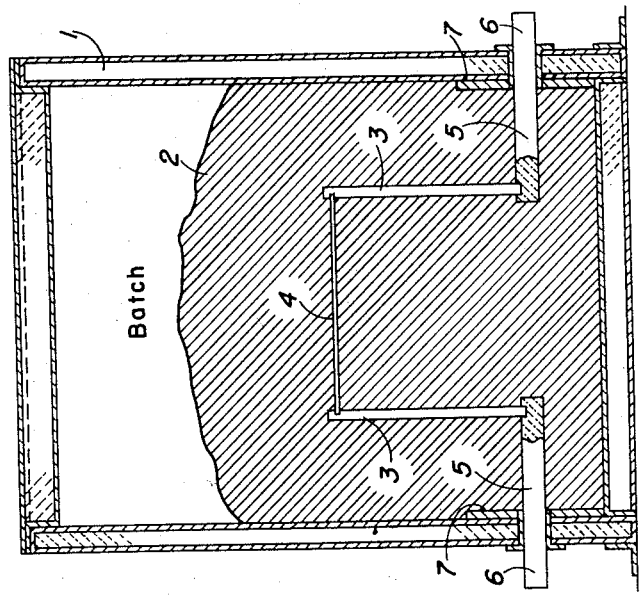
Fig. 2 represents a cross-section through the melting kiln before melting has begun.

In Figure 2, 1 indicates generally a kiln in which is placed a powdered batch of ingredients 2 for preparing synthetic mica. Elements 3, 3 are vertical carbon electrodes imbedded in the batch 2, and mounted in horizontal graphite electrodes, 5, 5, of relatively large diameter, which are connected at their ends 6, 6, to the A.C. power source. Electrodes 5, 5, are insulated from the kiln walls by means of asbestos cement boards 7, 7. Connected to the upper ends of vertical electrodes 3, 3 is a horizontal graphite resistor 4 of relatively smaller diameter. Passage of A.C. current through resistor 4 generates sufficient heat to melt the powdered batch 2 surrounding it. As the batch melts, the level of the melt continuously falls, due to the high porosity of the unconsolidated batch. Thus, in time, the resistor is exposed to an oxidizing atmosphere which causes the graphite resistor 4 to burn and be consumed. However, when this occurs, the molten pool is large enough to contact the vertical electrodes 3, 3, as shown in Figure 3, and the path of the A.C. current is directly through the melt 10, which is a good conductor.

Figure 1:
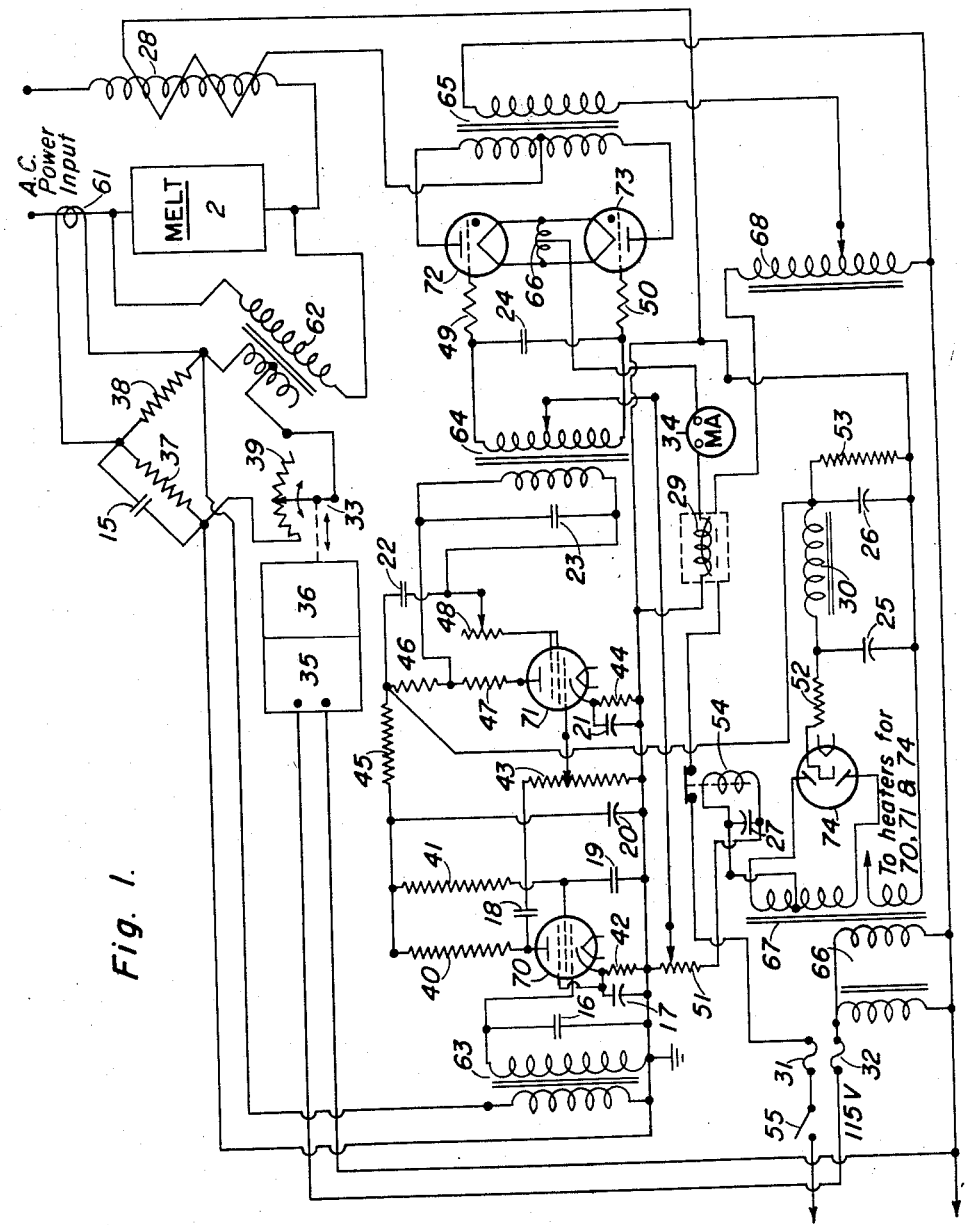

Referring to Fig. 1, current transformer 61 develops a voltage across resistor 38, one arm of an electrical bridge, that is proportional to the current through the melt. A voltage proportional to the voltage across the terminals of the melt is fed to another arm through transformer 62. These voltages are arranged to add when measured from top to bottom of the bridge. Resistor 37, shunted by capacitor 15, forms a fixed third arm, while variable potentiometer 39 constitutes the fourth arm. By using the ratios apparent in a balanced bridge, it can be seen that the voltage across the melt, divided by the current through the melt (which equals the resistance of the melt), multiplied by a constant due to transformers 61, 62 and resistor 38, is equal to the resistance of 39 divided by the resistance of 37.

Saturable core reactor 28 has two windings, one for alternating current and the other for direct current. The former acts as a variable impedance, varying with the amount of direct current passing through the second winding. The first winding is connected in series with the load, in this case the melt, to an appropriate source of A.C. power, such as 240 volts at 400 amperes, 60 cycles. At zero D.C. saturation, the resultant high impedance limits the A.C. power in the melt to a value of less than 5% of maximum whereas at maximum rated values of D.C., the impedance drops and about 95% of full power is available at the melt. The variation of minimum to maximum is as stepless as the D.C. applied, and the power gain, or ratio of A.C. power to D.C. is of the order of 300 to 1, depending on the size and specifications of the saturable core reactor. The coils are so wound on the core of the reactor that the direct current can partly or fully saturate the core with magnetic lines of force. This variation in turn influences the additional saturation due to A.C. current and controls the impedance that the A.C. current winding presents to the power circuit. Due to the geometry of the winding the voltage induced in the D.C. winding by the A.C. is cancelled out, resulting in no A.C. at the D.C. terminals.

Additional phase shift is applied to the sensing bridge by power changes in the melt resulting from changes in the impedance of the reactor. As the reactor changes from high to low impedance due to the degree of saturation, the current through the power circuit changes from a lag approaching 90 degrees behind the applied voltage to a lag approaching an in-phase condition. This shift must be vectorially added to the other voltage of the bridge.

Capacitor 15 becomes important only at points near the balance of the bridge, when the small voltage measured at the left and right terminals of the bridge is due only to any resistive unbalance plus the vector sum of that added by capacitor and resistors 37 and 39. The choice of capacitor 15 determines the throttling range of potentiometer 39 and within the limits of stability of the amplifier, the smaller the capacity of element 15, the more sensitive is the controller to small departures from the desired resistance. Throttling range is defined as the amount of rotation required of potentiometer 39 to accomplish a change from zero power to maximum.

To explain the control signal further, if the bridge were only resistive, as it approached and passed through resistive balance, the signal voltage would lessen, reach zero at balance, and then increase as balance was passed, changing its phase 180° with respect to line voltage. With the small capacitor 15 added, under the same balancing procedure, the signal voltage approaches but never reaches zero, owing to the capacitive unbalance introduced by the small capacitor. At a minimum voltage point determined by the size of 15, the signal voltage describes a semi-circle about the zero voltage point, its phase changing steplessly from the original relation to line voltage, to 180° difference.

The setting of potentiometer 39 is directly proportional to the resistance of the molten batch, as previously shown. Therefore, with the self-balancing bridge, adjustment of 39 causes power changes to bring about corresponding resistance changes in the molten batch. Small reversible motor 36 is connected to potentiometer 39 via a clutch, which permits manual adjustment, and a gear train (shown schematically as a mechanical linkage by 33), so that the final shaft speed is somewhat greater than the maximum rate of change anticipated. A variable drive is obtained by use of percentage timer 35 in the drive motor power circuit. To keep instantaneous changes small, a timer with segments of one minute was chosen. Said timer is connected in series with the 115 volt A.C. power source via fuse 32 and filament transformer 66.

The signal from the bridge is fed to an amplifier through an isolation transformer 63. The amplifier is of the conventional resistance-capacitance coupled type, with tuned transformer input and output. The secondary of transformer 63 is resonated to 60 c.p.s. by capacitor 16 to attenuate the third harmonic generated by the saturable core reactor 28, or any other transient voltage. After amplification by a conventional pentode and triode stage which includes vacuum tubes 70 and 71, capacitors 17, 18, 19, 20 and 21, resistors 40, 41, 42, 44 and 45, gain control 43, as well known to the art, the signal is fed into a phase shifting network consisting of resistors 46, 47, 48 and capacitor 22. This network allows manual adjustment to compensate for phase shifts in the amplifier and saturable core reactors. Also it allows throttling of the "Thyratrons" 72 and 75 from full to zero current in a stepless manner.

Transformer 64, resonated to 60 cycles per second by capacitors 23 and 24 and serving as an isolation transformer, feeds the control signal to the grids of "Thyratrons" 72 and 73 via resistors 49 and 50. This signal voltage must be of such instantaneous polarity so that an increase of melt resistance will phase the "Thyratrons" to deliver more D.C. power from transformer 65. "Thyratrons" 72 and 73 are arranged to conduct on alternate half cycles to give a smooth output, which is further filtered by the highly inductive nature of the D.C. winding of the reactor. Between chassis ground and the secondary center tap of transformer 66 are ammeter 34 and trip coil of circuit breaker 29, serving to indicate saturating current. Rectifier tube 74, resistors 52 and 53, capacitors 25 and 26, and choke 30 form a conventional D.C. power supply for amplifier tubes 70 and 71 plus the time delay device subsequently described. The circuit breaker which protects the thyratrons against over-current, is of the magnetic type, and can be operated manually for standby conditions.

The 115 volts A.C. power supply is connected to 68 via switch 55, fuse 31, and relay 54 having associated capacitor 27. Transformer 68 is connected to the primary of transformer 65, the secondary of which is connected to the anodes of the "Thyratrons." A center tap from the said secondary is connected to the D.C. winding of the saturable core reactor. Variable transformer 68, by controlling the maximum voltage available for rectification by the "Thyratrons," is effective in limiting the permissible power to the melt.

Relay 54 is utilized as a time delay device to allow the thyratrons to reach operating temperature before application of anode voltage. The voltage developed across the relay winding is applied as a negative bias to the thyratron grids through resistor 51 and the secondary of transformer 64, and is adjusted to barely extinguish the "Thyratrons" with vacuum tube 71 out of the socket. Thus the "Thyratrons" are driven into conduction by the signal, and equipment failure removes rather than increases the applied power.

Figure 4:
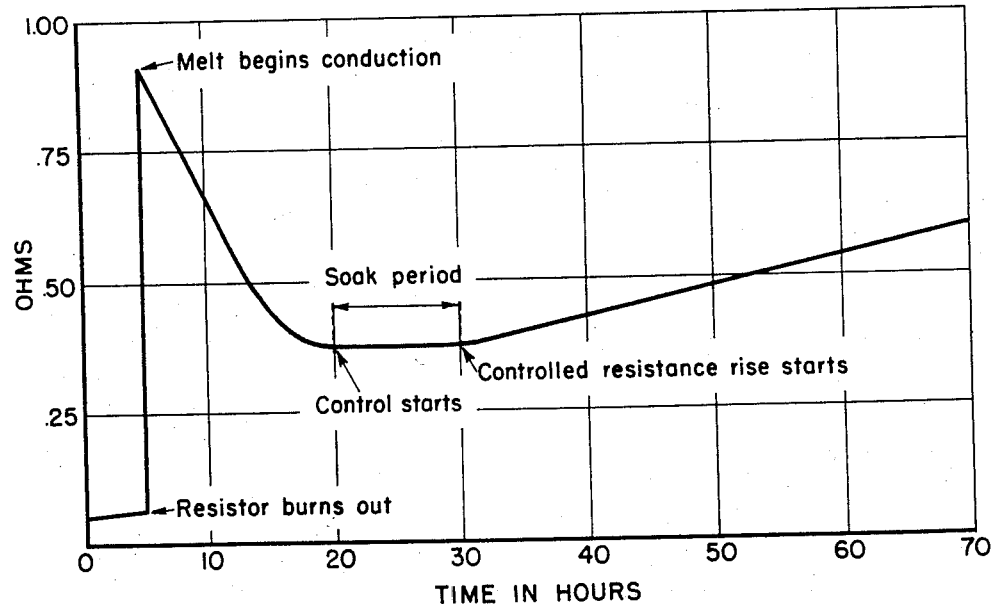
Fig. 4 is a graph showing the variation of the resistance with time.

Referring to Figure 4, the initial hours show very low resistance, which is that of the starting resistor 4. The high value of resistance shown as the resistor burns out, decreases quite rapidly at first, then more slowly as the melt increases in size. To this point the controller is operated manually, element 39 being set to a low value, and the maximum D.C. current to the saturated core reactor (and consequently the power input) being controlled manually by adjustment of transformer 68. The adjustable transformer controls the maximum anode voltage applied to the "Thyratrons." When the maximum permissible melt size is attained as shown by expendable thermocouples (which are not part of the control system) placed at strategic points in the batch, the controller is adjusted so that the bridge is balanced and the power, as adjusted by transformer 68, approximates the same as before. As the resistance is then to be held constant, the controller is set for automatic operation, and the power is gradually reduced and melting stops. In a matter of a few hours the power input is reduced to a level which just balances the dissipation of energy to the exterior of the kiln. Crystallization is now started by driving the variable arm 39 of the bridge to a higher value at a predetermined rate, by means of the drive motor 36. This reduces the power input to a point just short of energy dissipation requirements and allows solidification to begin. The slow rate of cooling is conducive to the growth of crystals of desirable size. When the resistance reaches a value several times that prevailing during the soak period, power is removed.

Figure 5:
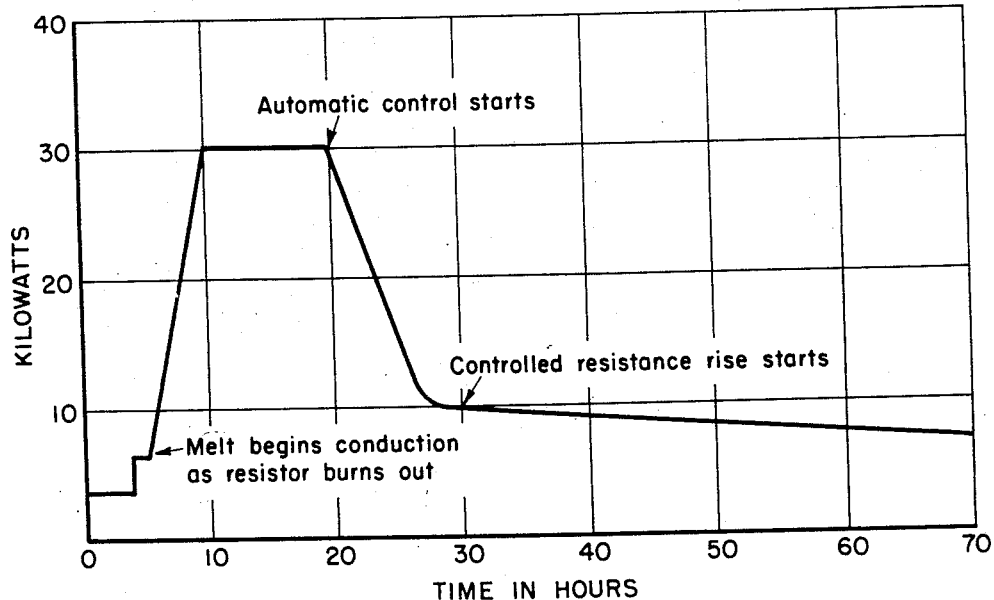
Fig. 5 shows a typical power input schedule to the kiln.

Figure 5 illustrates a typical power input schedule. After the electrically-heated resistor has had sufficient time to form a pool of molten batch, input power is increased to oxidize and consume the graphite resistor more rapidly. Following this, the power is increased rapidly, care being taken that the melt will not be superheated before some appreciable volume is attained. The melt carries current from the time the resistor breaks. The resistance figures shown are illustrative only, the actual resistance varying considerably with the batch composition.

To illustrate the operation of the automatic controller, let it be supposed that the schedule calls for a lower temperature. This means higher resistance and a lower power input, and in turn these require a core reactor less D.C. saturated. Motor 36 drives potentiometer 39 in a direction which causes the phase of the signal derived from the bridge network to be slightly delayed. This signal, after amplification, is applied to the grids of Thyratrons 72 and 73. The phase delay causes them to conduct for a shorter period of each positive half-cycle of voltage applied to their anodes from transformer 65, thereby lessening the average D.C. developed for the saturation of reactor 28.

The electrical value I have found satisfactory for various elements of the embodiment shown in circuit of Fig. 1 are:

(a) Capacitors in microfarads, 15—.05; 16—.25; 17—25; 21—25.0; 18—.05; 19—.1; 20—8; 21—25; 22—.25; 23—.25; 24—.02; 25—8; 26—16; 27—12;

(b) Resistors in ohms, 37—500; 38—1; 39—5000; 40—.5 megohm; 41—2 megohms; 42—2200; 43—1 megohm; 44—1200; 45—.1 megohm; 46—6800; 47—6800; 48—.15 megohm; 49—.1 megohm; 50—.1 megohm; 51—.1 megohm; 52—1000 ohms; 53—30,000 ohms;

(c) Vacuum tubes, 70 and 71—65J7; 72 and 73—FG-17 or 5557; 74—6X5GT.

The various transformers, chokes, relays, fuses, switches, etc., are selected to properly balance the circuit and give the necessary control.

Although I have described in detail a preferred embodiment of my invention, I am aware that many modifications thereof may be made without departing from the spirit of the invention, and that the invention may be utilized to advantage in other applications.

Having now described my invention, what I claim as new and desire to secure by Letters Patent is:

1. A control system for a load whose resistance varies with the A.C. power input, comprising a bridge, one arm of said bridge having a voltage proportional to the current through the load, an adjacent arm having a voltage proportional to the voltage across the load, a fixed resistance arm and a variable resistance arm, means for adjusting the variable resistance arm to vary the load resistance, means for amplifying the resultant bridge signal, and means responsive to said amplified signal for varying the power supply to said load.

2. A control system for a load whose resistance varies with the A.C. power input, comprising a bridge, one arm of said bridge having a voltage proportional to the current through the load, an adjacent arm having a voltage proportional to the voltage across the load, a fixed resistance arm and a variable resistance arm, means for adjusting the variable resistance arm to vary the load resistance, means for amplifying the resultant bridge signal, a variable impedance coil in series with said load, means responsive to said amplified signal for changing the impedance of said coil, whereby the power input to load is varied.

3. A control system for a load whose resistance varies with the A.C. power input, comprising a bridge, one arm of said bridge having a voltage proportional to the current through the load, an adjacent arm having a voltage proportional to the voltage across the load, a fixed resistance arm and a variable resistance arm, means for adjusting the variable resistance arm to vary the load resistance, means for amplifying the resultant bridge signal, a saturable core reactor having an A.C. winding in series with said load and a D.C. winding, means responsive to said amplified signal for changing the amount of D.C. saturation of said core, whereby the impedance of said A.C. winding is varied, and the power input to the load is thereby controlled.

4. A control system for a load whose resistance varies with the A.C. power input, comprising a bridge, one arm of said bridge having a voltage proportional to the current through the load, an adjacent arm having a voltage proportional to the voltage across the load, a fixed resistance arm and a variable resistance arm, means for adjusting the variable resistance arm to vary the load resistance, means for amplifying the resultant bridge signal, a saturable core reactor having an A.C. winding in series with said load and a D.C. winding, a D.C. current source for said D.C. winding, and means responsive to said amplified signal for varying the D.C. current to said D.C. winding, thereby varying the D.C. saturation of said core, and the impedance of the A.C. winding, whereby the power input to said load is controlled.

5. A control system for a load whose resistance varies with the A.C. power input, comprising a bridge, one arm of said bridge having a voltage proportional to the current through the load, an adjacent arm having a voltage proportional to the voltage across the load, a fixed resistance arm and a variable resistance arm, means for adjusting the variable resistance arm to vary the load resistance, means for amplifying the resultant bridge signal, a saturable core reactor having an A.C. winding in series with said load and a D.C. winding, a pair of gas tubes comprising a full-wave rectifier, each controlled for firing by a grid bias, means for adjustably shifting the phase of the amplified signal, means for impressing said signal on said control grids whereby the D.C. power output from said rectifier may be controlled, means in circuit for connecting the D.C. output from said rectifier to said D.C. winding of the saturable core reactor, whereby the A.C. power input to the load is controlled by the degree of saturation of the D.C. core reactor.

6. A control system for a mineral melt formed by passing A.C. current through a batch of solid reactants, the electrical resistance of said melt varying inversely with its temperature and size, comprising an electrical bridge, inductive means for sensing current through the melt, circuit means for applying the sensed current through one arm of said bridge, means for sensing voltage across the melt, circuit means for impressing said sensed voltage on an adjacent arm of said bridge, a fixed resistance arm having a capacitor in shunt therewith, and a variable resistance arm, means for varying the resistance of the variable resistance arm following a predetermined schedule, means for amplifying the resulting bridge signal, a saturable core reactor having an A.C. winding in series with said melt, and a D.C. winding, a D.C. current source for said D.C. winding and means responsive to said amplified bridge signal for varying the D.C. current to said D.C. winding, thereby varying the D.C. saturation of the said core reactor and the impedance of the A.C. winding, whereby the power input to the melt is controlled.

7. A control system in the preparation of synthetic mica formed by passing an A.C. current through a batch of reactants to form a melt whose electrical resistance varies inversely with its temperature and size, comprising, inductive means for sensing the current through the melt, an electrical bridge network having four arms, means for applying the sensed current through one arm, means for sensing voltage across the melt, means for applying the sensed voltage to an adjacent arm, a fixed resistance having a capacitor in shunt therewith serving as the third arm, and a variable resistance as the fourth arm, means for varying the resistance of the variable resistance arm following a predetermined schedule, means for amplifying the resulting bridge signal, a variable inductance element in series with said melt, means responsive to said amplified bridge signal for varying said inductance element, whereby the A.C. power input to said melt is controlled.

8. A control system in the preparation of synthetic mica formed by passing an A.C. current through a batch of reactants to form a melt whose electrical resistance varies inversely with its temperature and size, comprising, inductive means for sensing the current through the melt, an electrical bridge network having four arms, means for applying the sensed current through one arm, means for sensing voltage across the melt, means for applying the sensed voltage to an adjacent arm, a fixed resistance having a capacitor in shunt therewith serving as the third arm, and a variable resistance as the fourth arm, means for varying the resistance of the variable resistance arm following a predetermined schedule, means for amplifying the resulting bridge signal, a saturable core reactor having an A.C. winding in series with said melt and a D.C. winding, a D.C. current source for said D.C. winding, and means responsive to said amplified bridge signal for varying the D.C. current to said D.C. winding, thereby varying the D.C. saturation of the said core reactor and the concomitant impedance of the A.C. winding, whereby the A.C. power input to the melt is controlled.

9. A control system in the preparation of synthetic mica formed by passing an A.C. current through a batch of reactants to form a melt whose electrical resistance varies inversely with its temperature and size, comprising, inductive means for sensing the current through the melt, an electrical bridge network having four arms, means for applying the sensed current through one arm, means for sensing voltage across the melt, means for applying the sensed voltage to an adjacent arm, a fixed resistance having a capacitor in shunt therewith serving as the third arm, and a variable resistance as the fourth arm, means for varying the resistance of the variable resistance arm following a predetermined schedule, means for amplifying the resulting bridge signal, a saturable core reactor having an A.C. winding in series with said melt and a D.C. winding, a gas tube rectifier controlled by a grid bias voltage, means for adjustably shifting the phase of the amplified signal, means for impressing said controlled signal on a grid element of said rectifier, means in circuit for connecting the D.C. power output from said rectifier to said D.C. winding of the saturable core reactor, whereby the A.C. power input to the load is controlled by the degree of saturation of the core reactor.

10. A control system in the preparation of synthetic mica formed by passing an A.C. current through a batch of reactants to form a melt whose electrical resistance varies inversely with its temperature and size, comprising, inductive means for sensing the current through the melt, an electrical bridge network having four arms, means for applying the sensed current through one arm, means for sensing voltage across the melt, means for applying the sensed voltage to an adjacent arm, a fixed resistance having a capacitor in shunt therewith serving as the third arm, and a variable resistance as the fourth arm, means for varying the resistance of the variable resistance arm following a predetermined schedule, means for amplifying the resulting bridge signal, a saturable core reactor having an A.C. winding in series with said melt and a D.C. winding, a pair of gas tubes, comprising full-wave rectifier means, each of said gas tubes being controlled for firing by grid means, means for adjustably shifting the phase of the amplified signal, means for impressing said signal on said control grids, means in circuit for connecting the D.C. output from said rectifier to said D.C. winding of the saturable core reactor, whereby the A.C. power input to the melt is controlled by the degree of D.C. saturation of the core reactor.

References Cited in the file of this patent

UNITED STATES PATENTS

| | | |
|---|---|---|
| 1,320,071 | Lehr | Oct. 28, 1919 |
| 2,158,135 | MacFarlane | May 16, 1939 |
| 2,249,993 | Upton | July 22, 1941 |
| 2,711,435 | Humphrey | June 21, 1955 |
| 2,740,936 | Anderson | Apr. 3, 1956 |
| 2,825,864 | Eagan | Mar. 4, 1958 |
| 2,827,607 | Zimmerle | Mar. 8, 1958 |